Figure 1:
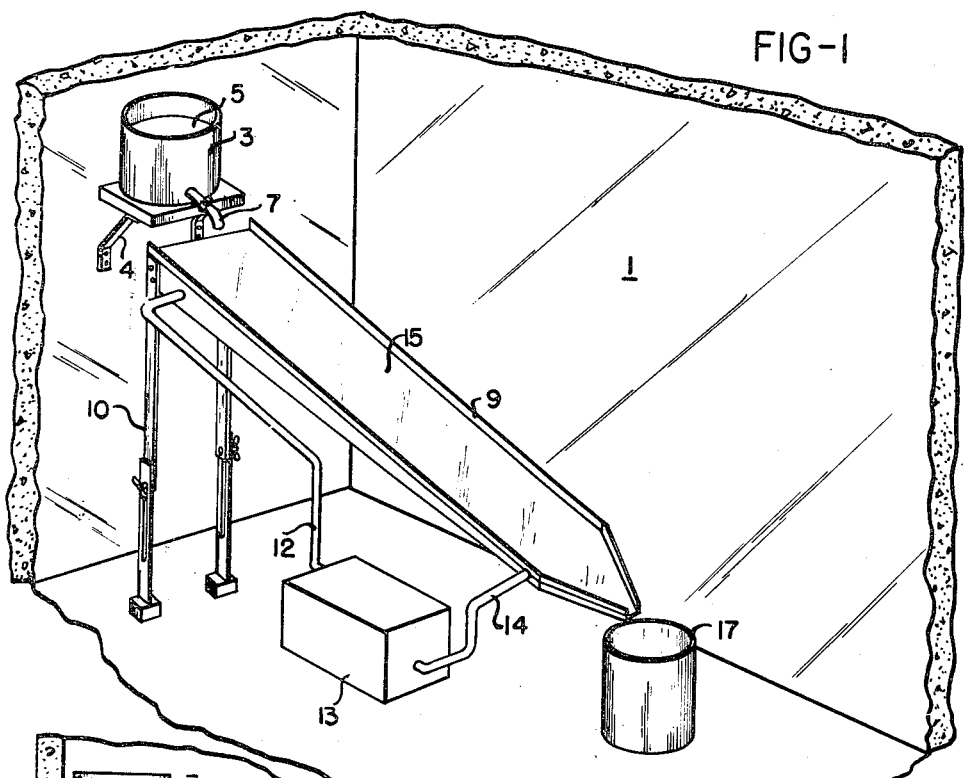

Jan. 22, 1957

C. BERGER 2,778,205

REMOVAL OF WATER FROM NON-AQUEOUS LIQUIDS

Filed Aug. 3, 1953

INVENTOR.
CARL BERGER
BY Toulmin & Toulmin
ATTORNEYS

United States Patent Office 2,778,205
Patented Jan. 22, 1957

2,778,205

REMOVAL OF WATER FROM NON-AQUEOUS LIQUIDS

Carl Berger, Dayton, Ohio, assignor to The Commonwealth Engineering Company of Ohio, Dayton, Ohio, a corporation of Ohio Application August 3, 1953, Serial No. 371,815

9 Claims. (Cl. 62—170)

This invention relates to the removal of water from suspensions, dispersions and the like.

Many liquid materials such as toluene, gasoline and benzene are subject to contamination by water which contamination usually results in container corrosion and other undesirable effects depending upon the purpose for which the liquid material is employed. As examples, water vapor of the atmosphere may permeate small openings in containers, or may be introduced to the liquids accidentally and the condensing vapor forms water molecules which are occluded in the liquid material in dispersed or suspended form.

Various methods have been employed to free or maintain liquids free of water. Thus dehydration agents such as calcium chloride, silica gel and activated alumina have been employed for removal of water from non-aqueous organic and inorganic media.

The water which is to be removed may be in suspended form, or it may have actually formed a dispersion with the liquid from which it is to be removed. This water is very generally in colloidal form, that is the particles are extremely small and accordingly the properties of the water are materially affected by the liquid which the water contaminates. Accordingly distillation procedures are usually ineffective to permit of water separation and the heat of such processes may itself be detrimental to the material from which the water is to be removed.

It is a primary object of this invention to provide a method for the removal of water from normally non-aqueous liquids, and which method does not require the addition of dehydrating agents.

It is an important object of this invention to provide a method for the removal of water from normally non-aqueous liquids and which method is both rapid and inexpensive.

It is another object of this invention to provide a system for the removal of water from normally non-aqueous liquids, which system involves only relatively low cost apparatus and which system is adaptable for use with a greater variety of materials.

It is also a principal object of this invention to provide a method for the removal of water from normally non-aqueous liquids which method occasions no deterioration in the liquid itself.

In the practice of the invention the normally non-aqueous liquid from which the water is to be removed is cooled to just above the freezing point of water and is then flowed in thin streams over ice maintained at temperatures of zero degrees centigrade and less; the flow of the liquid is at a rate such that the water in the material freezes and accumulates on the ice.

A feature of the invention is that it is not necessary that the water droplets in the suspension or colloidal dispersion actually physically touch the ice to have freezing initiated. Normally in suspensions the water will in its passage over the ice make such physical contact; in colloidal dispersion form however the water molecules may be initially, that is prior to freezing, insulated from physical contact with the ice by the non-aqueous liquid. This does not prevent freezing if the ice is at zero degrees or lower as the vapor pressure relationship between the vapor of the ice and the vapor phase of the water molecules are such that water cannot exist in liquid form in the presence of the ice. It is then only necessary that the ice and water be in such proximity that the vapor phases contact or co-act to cause freezing of the water. This is effected by flowing the colloidal dispersion over the ice in suitably thin streams.

The temperature at which the ice must be maintained will vary with the nature of the material which forms the dispersion or suspension with the water. Generally with organic liquids such as benzene, toluene and gasoline this temperature need not be lower than minus 15 degrees centigrade; in the case of toluene, for example, a temperature of minus 10 degrees centigrade is eminently suited to the solidification of the dispersion on the ice. The reference to toluene is to be understood as exemplary only since the conditions vary but slightly for other non-aqueous liquids.

The rate of flow of the liquid over the ice, the temperature of the ice and the depth of the flowing stream are to some extent at least correlative factors; if the flow is extremely slow the depth may be somewhat greater than when a normal flow under say, the influence of gravity, occurs. The ice temperature also is related to the flow rate and depth and should be lower as flow rate and depth increase. In general a flow in a relatively thin stream of one-tenth of an inch depth under the influence of gravity is satisfactory for removal of the water from a toluene dispersion when the ice is at minus 10 degrees centigrade. The more intimate the contact of the liquid with the ice and the lower the temperature of the ice the more readily are colloidal dispersions with the water broken.

Figure 2:
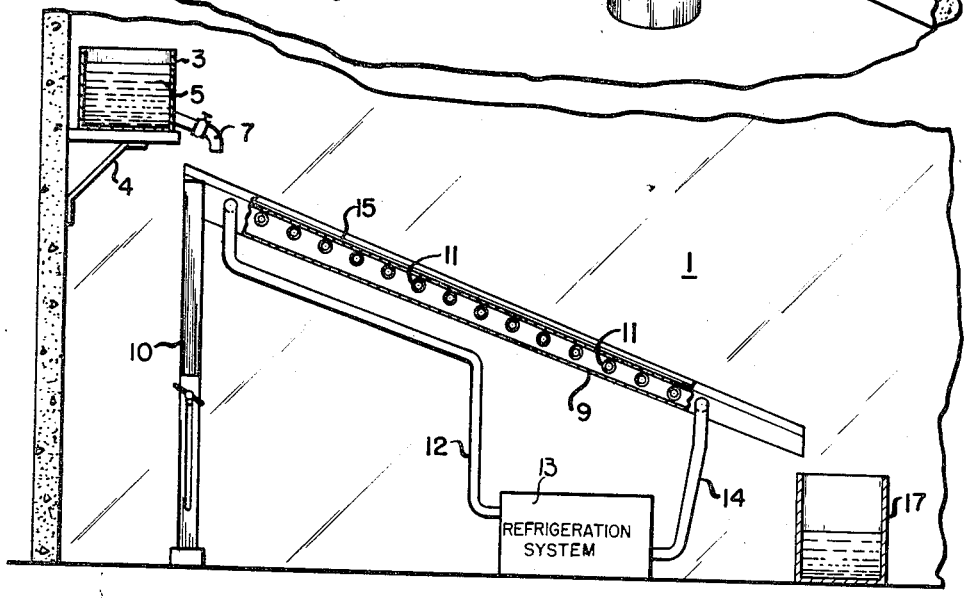

The invention will be more fully understood by reference to the following detailed description and accompanying drawing wherein:

Figure 1 is a perspective view of apparatus useful in the practice of the invention; and Figure 2 is a side elevational view partly in section of the apparatus of Figure 1.

Referring to the drawings the numeral 1 indicates generally a room or chamber supplied with dry air in any conventional manner known to the art; apparatus for such purpose is readily commercially available.

The room 1 is provided with a container 3 supported on bracket 4 and having therein the liquid 5 maintained at a temperature just above 0° C. The liquid may be toluene, for example, and is to be freed of contaminating water which forms a colloidal dispersion therewith, the water being present to the extent of about 2.5% by weight.

A nozzle 7 extends from the container 3 over an inclined way 9 adapted to spray the liquid 5 thereon. Way 9 is adjustably supported as by legs 10 in any suitable manner and is preferably of a good heat conductive metal, i. e. aluminum; the flow rate of liquids passing over the plane may be varied by varying the inclination thereof. The body of the plane at 11 has interconnected cooling coils provided with a refrigerant from any suitable source indicated at 13; conduit 12 supplies the refrigerant to the coils and the same is recycled back through conduit 14. Such sources are available commercially and normally employ a refrigerant such as Freon to effect cooling.

The coils 11 may if desired be separate from the inclined way but normally it is desirable for reasons of improved heat transfer and economy to core out the way in order to provide the coils.

The way 9 is initially provided with a thin coating of ice 15 and the spray from nozzle 7 contacts the same directly. In the present instance since the liquid 5 is assumed to be toluene the way and ice thereon are maintained at a temperature of about minus 10 degrees centigrade. The liquid in container 3 is refrigerated by means (not shown) to a temperature of about 1 degree centigrade for application to the way.

In specific application to the toluene-water dispersion described the liquid 5 may be flowed over the way 9, substantially only under the influence of gravity, at a depth of about 0.2 of an inch. The way preferably has a length of about seven feet and is tilted at about 45° to the horizontal; the ice 15 is maintained at about minus 10° C. Under these conditions all of the water will be removed in one pass of the way 9.

The water in the toluene will in most instances not contact the ice directly—but the vapor of the water and that of the ice are in sufficient proximity and sufficiently low in temperature that the water cannot exist in the liquid form and accordingly it begins to freeze even though surrounded by toluene. This apparently creates some discontinuity in the flow and the toluene moves out of the way of the forming ice which then contacts the ice 15 on the way and adheres thereto. Thus complete separation is effected.

The effect described above is of course present in the case of suspensions or physical mixtures also but the predominating influence where the mixture is mechanical is the physical contact of the water and ice.

The apparatus for the practice of the invention is inexpensive, simple to maintain and is adjustable to a variety of conditions. In this connection it is to be noted that when the water solidifies to ice that considerable heat, relatively speaking, is given off and the refrigeration equipment should be selected to have a sufficient capacity to maintain a low temperature even in the presence of considerable ice deposition.

It will be understood that this invention is susceptible to modification in order to adopt it to different usages and conditions and accordingly, it is desired to comprehend such modifications within this invention as may fall within the scope of the appended claims.

I claim:

1. In the method of removing contaminating water from a liquid with which the water is immiscible and in which liquid the water-contaminant is present in finely dispersed particles, which method comprises flowing the water-contaminated liquid over ice with the vapor phase of the water-contaminant particles and the vapor phase of the ice in sufficient proximity to each other to co-act to cause water-contaminant particles to solidify and settle out on the ice.

2. In the method of removing contaminating water from a liquid with which the water is immiscible and in which liquid the water-contaminant is present in finely dispersed particles, which method comprises flowing the water-contaminated liquid down an inclined sheet of ice with the vapor phase of the water-contaminant particles and the vapor phase of the ice in sufficient proximity to each other to co-act to cause water-contaminant particles to solidify and settle out on the ice.

3. In a method of removing contaminating water from a liquid with which the water is immiscible and in which liquid the water-contaminant is present in finely dispersed particles, which method comprises providing a sheet of ice and maintaining the same at a temperature such that the sheet remains in solid ice condition, cooling the water-contaminated liquid to just above the freezing point of water, and flowing the water-contaminated liquid over the sheet of ice with the vapor phase of the particles of water-contaminant and that of the ice in sufficient proximity to each other to co-act to cause the water-contaminant of the liquid to solidify and settle out on the ice.

4. In a method of removing contaminating water from a liquid with which the water is immiscible and in which liquid the water-contaminant is present in finely dispersed particles, which method comprises providing a sheet of ice and maintaining the same at a temperature below the freezing point of water, cooling the water-contaminated liquid to just above the freezing point of water, and flowing the water-contaminated liquid over the sheet of ice with the vapor phase of the particles of water-contaminant and that of the ice in sufficient proximity to each other to co-act to cause the water-contaminant of the liquid to solidify and settle out on the ice.

5. The method of removing contaminating water from toluene which comprises the step of flowing the water-contaminated toluene over a sheet of ice maintained at a temperature of about minus 10° C.

6. The method of removing contaminating water from toluene which comprises the step of flowing the water-contaminated toluene over an inclined plane of ice maintained at a temperature of about minus 10° C.

7. The method of removing contaminating water from toluene which comprises the steps of cooling the toluene to just above the freezing point of water and flowing the water-contaminated toluene over an inclined plane of ice maintained at a temperature of about minus 10° C.

8. The method of removing contaminating water from toluene which comprises the steps of cooling the toluene to about 1° C. and flowing the water-contaminated toluene over an inclined plane of ice maintained at a temperature of about minus 10° C.

9. The method of removing contaminating water from toluene, which comprises the step of flowing the water-contaminated toluene over a sheet of ice at a low temperature, with the vapor phase of the water and that of the ice in sufficient proximity to each other to coact to cause the water of the toluene to solidify and settle out on the ice.

References Cited in the file of this patent

UNITED STATES PATENTS

| | | |
|---|---|---|
| 706,511 | Barrath | Aug. 12, 1902 |
| 2,221,212 | Wussow et al. | Nov. 12, 1940 |
| 2,340,721 | Whitney | Feb. 1, 1944 |
| 2,344,969 | Claffey | Mar. 28, 1944 |
| 2,637,177 | Reedall | May 5, 1953 |